D. & A. S. MARKHAM & D ELDRED.
Grain-Drill.
No. 22,184.
Patented Nov 30. 1858.
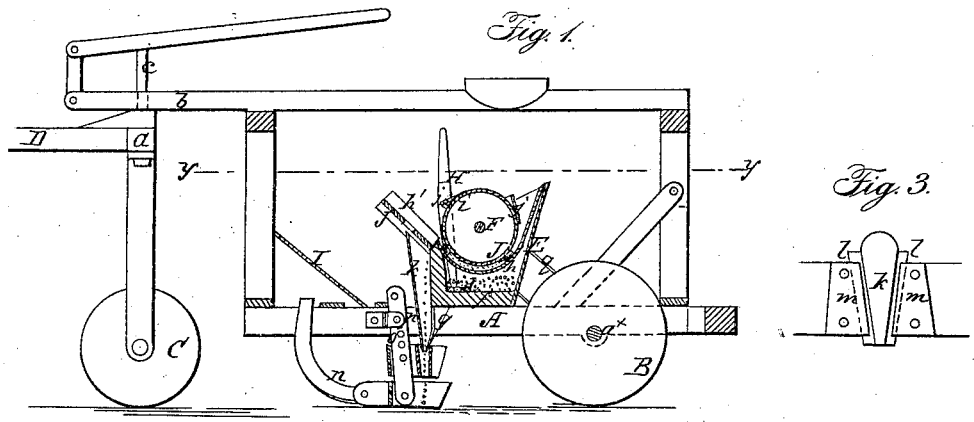
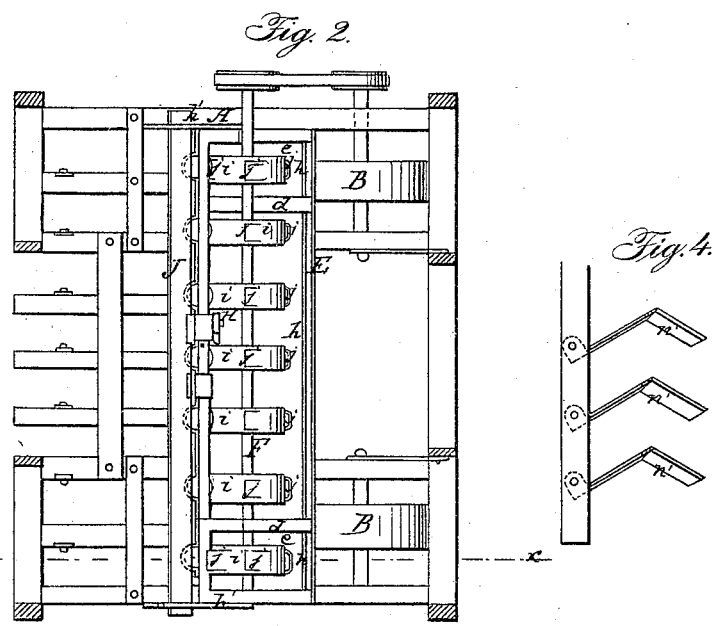

UNITED STATES PATENT OFFICE.

DANIEL MARKHAM, AUSTIN S. MARKHAM, AND DAVID ELDRED, OF MONMOUTH, ILLINOIS.

IMPROVEMENT IN SEEDING-MACHINES.

Specification forming part of Letters Patent No. 22,184, dated November 30, 1858.

*To all whom it may concern:*

Be it known that we, DANIEL MARKHAM, AUSTIN S. MARKHAM, and DAVID ELDRED, all of Monmouth, in the county of Warren and State of Illinois, have invented a new and Improved Seeding-Machine; and we do hereby declare that the following is a full, clear, and exact description of the same, reference being had to the annexed drawings, making a part of this specification, in which—

Figure 1 is a vertical section of our invention, taken in the line $x$ $x$, Fig. 2. Fig. 2 is a horizontal section of the same, taken in the line $y$ $y$, Fig. 1. Fig. 3 is a section of the front of the seed-box, showing one seed-tube. Fig. 4 is a detached perspective view of three shares.

Similar letters of reference indicate corresponding parts in all the figures.

This invention consists in a peculiar manner of arranging two seed-distributing devices in one and the same hopper, as hereinafter fully shown and described, whereby seed may be planted in check-rows, in drills, or broadcast, as may be desired.

To enable those skilled in the art to fully understand and construct our invention, we will proceed to describe it.

A represents a horizontal frame, the back part of which is supported by a pair of wheels, B B, the front part being supported by a pair of wheels, C, which are attached to a cross-bar, $a$, at the back part of the draft-pole D, a bar, $b$, which is attached to frame A, resting on the bar $a$. A vertical pin, $c$, which is attached to the cross-bar, $a$, passes up through the bar $b$ and connects the bar $b$ to the bar $a$ of the draft-pole D.

On the frame A a seed-box, E, is placed, said box extending the whole width of the frame A, and having two vertical partitions, $d$ $d$, in it, one near each end, so as to form two compartments, $e$ $e$. (See Fig. 2.)

On the bottom $f$ of the box E a slide-bar, G, is placed, and a vertical lever, H, is attached to said bar, each end of the bar G being perforated, the perforated ends working in the compartments $e$ $e$, with each of which a seed-conveying tube, $g$, communicates.

Within the seed-box E curved steel metal strips $h$ are placed, as shown clearly in Fig. 1, a strip being in each compartment $e$ $e$, and also in the long intermediate space. Longitudinally on the box E a shaft, F, is placed, said shaft having a series of wheels, $i$, placed on it, each wheel having a number of buckets, J, attached to its periphery. To the front side of the seed-box E a series of vertical tubes, $k$, are attached, one before each wheel $i$. These tubes are each provided with flanges $l$ at their upper parts, said flanges fitting between cleats $m$, attached to the front side of the hopper. (See Fig. 3.)

To the frame A a series of shares, $n$, are attached. These shares may be constructed in any proper way, so formed as to either make furrows or drills, or to act only as coverers in case of sowing broadcast, and as different forms of shares are required in order to suit the way in which the seed is planted they are so attached to the frame that they may be readily removed and attached to it when necessary. (See Fig. 1, in which one of the shares is shown provided at its back end with a vertical plate, $o$, perforated with holes, through either of which a screw, $p$, passes, the front end being curved upward and fitting in a groove in a longitudinal bar of the frame A.)

When the machine is to be used for planting in close drills the seed is placed in the box E and on the strips $h$, which form a supplemental bottom for the box. As the machine is drawn along the shaft F, and consequently the wheels $i$, are rotated by a belt, $q$, from the axle $a^x$ of the wheels B B. As the wheels $i$ rotate the buckets $j$ scoop up the seed and deposit it in the tubes $k$, which convey it to the drills made by the shares $n$.

When the machine is to be used as a corn-planter, so as to plant the corn in check-rows, the plates or strips $h$ are removed from said compartments. The shaft F is also removed, and also the shares $n$ and the tubes $k$, the latter being readily removable in consequence of being fitted between the cleats $m$. The corn is then placed in the compartments $e$ $e$, and the slide-bar G is moved in consequence of the operator actuating the lever H, the corn being distributed through the perforations of the bar G into the tubes $g$, which convey it to the hills.

In the front part of the frame A a plate, I, is placed transversely, (see Fig. 1,) and this plate is inclined at an angle of about thirtyfive or forty degrees and facing the seed-box E. To each end of the seed-box E an inclined grooved bar, $h'$, is attached, and J is a plate, the ends of which are fitted in said bars $h\ h$. This plate may be moved in and out from the seed-box E, and when its lower edge is in contact with the seed-box, as shown in red, Fig. 1, no distribution of seed can take place—that is, when the wheels $i$ are used—for the seed will be conducted by said plate directly back into the seed-box E. When, therefore, seed is being planted in drills the plate J is shoved out from the seed-box, and in order to save the trouble of ungearing the shaft F from the axle $a^x$ when no distribution of seed is desired, as in passing over rocks, barren ground, or in moving the machine from place to place, the plate J is merely shoved down in contact with the seed-box. In case seed is to be sowed broadcast, the seed-box E is adjusted rather nearer the plate I, so that the wheels $i$ may throw the grain directly on the plate I, which serves to scatter the seed and spread it broadcast on the ground.

In sowing seed in close drills it will be recollected that the shares $n$ are used; but in sowing broadcast these may be removed and other shares, $n'$, having oblique positions, as shown in Fig. 4, attached, in order to more fully cover the seed by passing over the entire surface of the ground.

From the above description it will be seen that the machine may be used for planting seed in various ways—in fact, all ways that it can be planted or is practical—and by a very simple arrangement of means.

We do not claim broadly and separately the wheels $i$, provided with buckets $j$ for distributing seed, for they have been previously used; neither do we claim a board or plate, I, so placed relatively with the hopper as to receive the seed and scatter the same, for such board or plate has also been used, as also has the perforated slide-bar G, which we consequently disclaim; but,

Having thus described our invention, what we claim as new, and desire to secure by Letters Patent, is—

The arrangement of the rotating shaft F, provided with distributing-wheels $i$, having buckets attached, the slide-bar G, the plate I, and adjustable strips or bottom $h$, substantially as shown, whereby seed may be planted from the same seed-box, either in drills, check-rows, or broadcast, as may be desired.

DANIEL MARKHAM.
AUSTIN S. MARKHAM.
DAVID ELDRED.

Witnesses:
J. A. McCALLON,
C. M. MILLS.